United States Patent

Lohaus

[11] Patent Number: 6,089,121
[45] Date of Patent: Jul. 18, 2000

[54] ROTATIONAL VIBRATION DAMPER

[75] Inventor: Norbert Lohaus, Schweinfurt, Germany

[73] Assignee: Mannesmann Sachs AG, Schweinfurt, Germany

[21] Appl. No.: 09/260,872

[22] Filed: Mar. 2, 1999

[30] Foreign Application Priority Data

Mar. 2, 1998 [DE] Germany ............................ 198 08 731

[51] Int. Cl.[7] .................................................. F16F 15/14
[52] U.S. Cl. .......................................................... 74/574
[58] Field of Search ................................ 74/572, 573 R, 74/574

[56] References Cited

U.S. PATENT DOCUMENTS

| | | | |
|---|---|---|---|
| 2,379,255 | 6/1945 | Rubissow | 74/574 |
| 4,932,286 | 6/1990 | Fukushima | 74/574 |
| 5,733,218 | 3/1998 | Sudau et al. | |
| 5,941,134 | 8/1999 | Cooke et al. | 74/574 |

FOREIGN PATENT DOCUMENTS

| | | | |
|---|---|---|---|
| 42 00 174 | 8/1992 | Germany | F16F 15/30 |
| 2 280 943 | 2/1995 | United Kingdom . | |
| 2 313 898 | 12/1997 | United Kingdom . | |
| 2 318 169 | 4/1998 | United Kingdom . | |
| 2 325 041 | 11/1998 | United Kingdom . | |

*Primary Examiner*—Dirk Wright
*Attorney, Agent, or Firm*—Cohen, Pontani, Lieberman & Pavane

[57] ABSTRACT

A rotational vibration damper, especially for arrangement in a drive train of a motor vehicle driven by an internal combustion engine, comprises first and second damping components that are rotatable together as well as relative to each other around a common rotational axis. The first and second damping components are connected to each other for rotational force transmission by a coupling mass arrangement. The coupling mass arrangement is connected to the first damping component so as to be pivotable about a pivot axis that is offset substantially axis-parallel to the center of gravity of the coupling mass arrangement and to the rotational axis. The coupling mass arrangement has two contact surface regions arranged at a distance from each other in the circumferential direction relative to the pivot axis and face away from each other. The second damping component has two counter-contact surface regions arranged at a distance from each other in the circumferential direction relative to the rotational axis and face each other. The two contact regions respectively contact the two counter-contact regions for rotational force transmission between the coupling mass arrangement and the second damping component.

21 Claims, 4 Drawing Sheets

ROTATIONAL VIBRATION DAMPER

BACKGROUND OF THE INVENTION

1. Field of the Invention

The invention relates to a rotational vibration damper provided, particularly, for arrangement in a drive train of a motor vehicle driven by an internal combustion machine.

2. Description of the Related Art

A prior art rotational vibration damper is disclosed in German reference DE 42 00 174 A1. The rotational vibration damper is disclosed as a dual-mass flywheel of a friction clutch, comprising two centrifugal masses rotatable together as well as relative to each other around a common rotational axis. One of the centrifugal masses is an input component and the other of the centrifugal masses is an output component of the rotational vibration damper. The two flymasses are connected for the purpose of transmitting rotational forces by a plurality of coupling masses distributed evenly around the rotational axis. Each of the coupling masses has a pendulum weight pivotally connected to the first flymass about a pivot axis which is offset relative to the rotational axis in axis-parallel fashion. The center of gravity of the pendulum weight lies outside of the pivot axis. If no torque is transmitted when the rotational vibration damper is rotated around the rotational axis, the pendulum weight, by virtue of the centrifugal force acting up it, is arranged relative to the first flymass in such a way that the center of gravity of the pendulum weight lies on a common plane with the pivot axis and the rotational axis. A substantially circumferentially oriented elongated connecting element is arranged around the rotational axis to transmit rotational forces from the pendulum weight to the second flymass. The elongated connecting element is connected, on one side, to the second flymass and, on the other side, at a point radially outside of the pivot axis, to the pendulum weight. During operation, a torque to be transmitted between the two flymasses attempts, by introducing a rotational force via this connecting element, to rotate the connecting element around the pivot axis relative to the first flymass against the action of the centrifugal force, whereby the two flymasses also rotate relative to each other. At a constant torque to be transmitted, the pendulum weight assumes a position of equilibrium relative to the first flymass at which the centrifugal force and the rotational force counterbalance each other. The centrifugal force attempts to orient the center of gravity of the pendulum weight radially relative to the pivot axis and the rotational force introduced via the connecting element attempts to orient the center of gravity of the pendulum weight in the circumferential direction. If fluctuations occur in the torque to be transmitted, the pendulum weight is pivoted around the equilibrium position on both sides and thereby allows the two flymasses to rotate relative to each other. As a result of pivoting, the rotational vibrations occurring between the two flymasses are damped. The relative rotation of the two flymasses counteracts an inertial force of the pendulum weight that resists a pivoting of the pendulum weight due to the inertial moment of the pendulum weight relative to the pivot axis. The resistance to pivoting provided by the inertial moment lends necessary rigidity to the rotational vibration damper.

The rotational vibration damping properties of the rotational vibration damper are substantially determined by the mass distribution of the pendulum weight; the distance between the center of gravity of the pendulum weight and the pivot axis; the distance between the pivot axis and the rotational axis; and the length of the connecting element. By changing these distances and the mass distribution, it is possible to change the rotational vibration damping properties within a certain framework. However, the possibilities for adjusting as desired the curve of the transmitted torque based on the rotational deflection of the two flymasses relative to each other are limited.

SUMMARY OF THE INVENTION

The object of the present invention is to provide a rotational vibration damper with two damping components connected by at least one coupling mass arrangement, whose rotational vibration damping properties are adjustable in a wider range than in the prior art devices.

The invention starts from a rotational vibration damper to be arranged, in particular, in a drive train of a motor vehicle. The rotational vibration damper has two damping components rotatable together as well as relative to each other around a common rotational axis, one of which is an input component and the other of which is an output component of the rotational vibration damper. The damping components are connected by at least one coupling mass arrangement connected to the first of the two damping components so as to be pivotable about a pivot axis that is offset in a substantially axis-parallel fashion relative to the center of gravity of the coupling mass arrangement and relative to the rotational axis. According to the invention, the coupling mass arrangement in such a rotational vibration damper has two contact surface regions arranged at a distance from each other in the circumferential direction relative to the pivot axis and facing away from each other and the second of the two damping components has counter-contact surface regions arranged at a distance from each other in the circumferential direction relative to the rotational axis and facing each other.

Upon rotation of the rotational vibration damper around the rotational axis during operation, the centrifugal force acting on the center of gravity of the coupling mass arrangement attempts to orient the coupling mass arrangement relative to the first damping component in such a way that the center of gravity, the pivot axis and the rotational axis are arranged on a common plane.

When a rotational force directed in the rotational direction is to be transmitted from the first to the second damping component, the second component rotates relative to the first component against the rotational direction. The forward contact surface region (facing the rotational direction) rests on the forward counter-contact surface region of the second damping component and the rotational force which is transmitted via this counter-contact surface region from the second damping component to the coupling mass arrangement and acts in the circumferential direction against the rotational direction pivots the coupling mass arrangement from its radially oriented position. At a uniform torque to be transmitted, the coupling mass arrangement arranges itself relative to the first damping component in an equilibrium pivot position. The centrifugal force acting on the coupling mass arrangement and the rotational force acting in the circumferential direction counterbalance each other at the equilibrium pivot position. This pivot position is—in addition to the torque to be transmitted and the centrifugal force resulting from the speed—substantially determined by the inclination relative to the circumferential direction of the contact surface and the counter-contact surface in the area where these surfaces adjoin each other.

If fluctuations occur in the torque to be transmitted during operation, the rotational position of the coupling mass arrangement relative to the first damping component can move from the equilibrium position. This leads, at the same time, to a rotation of the two damping components relative to each other and thus to a rotational vibration damping. Because the coupling mass arrangement must be accelerated for such pivoting, its inertial force counteracts the pivoting and the rotation of the two damping components. This counteracting of the pivoting and rotation of the two damping components lends a necessary rigidity to the rotational vibration damper.

The design of the contact surface regions and counter-contact surface regions alone offers abundant possibilities for adjusting the rotational force transmission properties of the rotational vibration damper.

In a preferred embodiment, the two counter-contact surface regions of the second damping component extend substantially parallel to each other in such a way that a straight line that runs between and parallel to the two counter-contact surface regions is oriented substantially radially relative to the rotational axis. This simple embodiment of the rotational vibration damper ensures the reliable and jamming-free deflection of the coupling mass arrangement from its radial position.

In another embodiment which permits a larger and less rigid rotational deflection of the two damping components relative to each other, at least one of the counter-contact surface regions extends radially outwardly and circumferentially toward the other of the counter-contact surface regions.

In turn, the at least one counter-contact surface region preferably has an inclination relative to the circumferential direction that declines continuously in the radially outward direction. This continuous decline produces a transmitted rotational force that increases progressively as a function of the rotational deflection of the two damping components relative to each other. That is, a rotational vibration damper having the at least one counter-contact region with an inclination that continuously declines in the radially outward direction reacts relatively softly to small rotational vibrations and increasingly more rigidly to increasingly large rotational vibrations.

In a further embodiment, the inclination of a first counter-contact surface region relative to the circumferential direction is smaller at a predetermined radius relative to the rotational axis than the inclination of the second counter-contact surface region relative to the circumferential direction at the same radius. The different inclinations, provide different rotational vibration damping properties for different directions of torque to be transmitted, i.e., for pulling operation and pushing operation when the rotational vibration damper is installed in a drive train.

In a preferred embodiment, the contact surface regions of the coupling mass arrangement projected onto a plane arranged at a right angle to the rotational axis have a convex surface curve. This convex surface curve permits reliable and flexible pivoting of the coupling mass arrangement relative to the first damping component and allows the contact surface regions of the coupling mass arrangement to roll on the counter-contact surface regions of the second damping component with a reduced slide friction.

In a simple embodiment, the coupling mass arrangement comprises a disk element of, for example, sheet metal which is oriented substantially orthogonally relative to the pivot axis.

It is preferable, especially when used with parallel counter-contact surface regions, for the disk element to have a substantially circular outline. In this embodiment, a pivot clearance that is independent of the rotational position of the coupling mass arrangement relative to the first damping component can be easily set between the coupling mass arrangement and the second damping component in the circumferential direction relative to the rotational axis.

The second damping component further includes a third counter-contact surface region directed substantially toward the rotational axis. The coupling mass arrangement radially rests on the third counter-contact surface region when the coupling mass arrangement is located in a pivot position wherein the pivot axis, the center of gravity and the rotational axis are arranged substantially on one plane. The centrifugal forces acting on the coupling mass arrangement during operation are absorbed by the third counter-contact surface region of the second damping component. In this manner, the third counter-contact surface relieves the pivot bearing that connects the coupling mass arrangement to the first damping component. This measure increases the useful life of this pivot bearing and can be implemented especially simply when the pivot bearing permits a certain radial clearance of the coupling mass arrangement relative to the first damping component.

To promote steady running of the rotational vibration damper, the coupling mass arrangement has the smallest possible rotational clearance about the pivot axis, i.e., the coupling mass arrangement is guided on its contact surface regions on both sides by the counter-contact surfaces areas of the second damping component. Preferably, this substantially clearance-free arrangement of the coupling mass arrangement between the counter-contact surface regions is provided for the pivot position of the coupling mass arrangement wherein its center of gravity, the pivot axis and the rotational axis are arranged substantially on one plane. This arrangement corresponds to an operating state in which there is a small torque to be transmitted or to an idle state. In this state load changes occur frequently and a greater clearance could produce undesired noise as the result of the frequently changing contact between the contact surface regions and the opposite counter-contact surface regions.

Moreover, the coupling mass arrangement is preferably held in the idling pivot position wherein its center of gravity, the pivot axis and the rotational axis are arranged substantially on one plane by means of spring force. The spring force may be applied such, for example, as by a spring that flexibly connects the coupling mass arrangement to the first damping component. This produces better rotational vibration damping properties even at low speeds of the rotational vibration damper, because at these low speeds, the centrifugal force that attempts to orient the coupling mass arrangement radially is low.

A further improvement in the rotational vibration damping properties is attained by use of a friction device that opposes a friction force to a movement of the coupling mass arrangement relative to the first damping component and thus damps rotational vibrations between these two elements and prevents the creation of resonances.

Because the inertial moment of the coupling mass arrangement relative to the pivot axis counteracts a pivoting of the two damping components relative to each other, this inertial moment is an essential parameter in adjusting the rotational vibration damping properties. It is especially advantageous to design this inertial moment to be as large as possible. The inertial moment of the coupling mass arrangement may be functionally increased by connecting the coupling mass arrangement to an auxiliary mass rotatable around the rotational axis relative to the first damping component. The auxiliary mass rotates around the rotational axis relative to the first damping component during pivoting of the coupling mass arrangement around the pivot axis. In this arrangement, the auxiliary mass rotates when the coupling mass arrangement is pivoted such that the pivoting of the coupling mass arrangement counteracts seemingly increased inertial forces.

In a preferred embodiment, a pivot bearing such, for example, as a slide bearing is provided for the attachment of the coupling mass arrangement to the first damping component.

A preferred mounting of the coupling mass arrangement on the first damping component is possible when a cross-section of the first damping component along the longitudinal axis has a substantially U-shaped structure that opens radially inward toward the axis of rotation and the second damping component and the coupling mass arrangement are at least partially encompassed by the U-shaped structure. In this embodiment, the coupling mass arrangement is connectable symmetrically to both legs of the U-shaped structure of the first damping component. Preferably, the pivot bearing is formed by two journals extending coaxially relative to the pivot axis in the direction of the first U-leg, on one side, and in the direction of the other U-leg, on the other side. These journals engage corresponding recesses in the U-legs of the first damping component.

To strengthen the connection of the two damping components and to make symmetric the centrifugal forces exercised by the coupling mass arrangements, a plurality of coupling mass arrangements are advantageously arranged in the circumferential direction and, in particular, evenly distributed.

Steady and centered running is preferably achieved by rotatably mounting the first damping component on the second damping component by means of a rotary bearing such, for example, as a slide bearing.

In a preferred application, the rotational vibration damper is the dual-mass flywheel of a friction clutch. In this case, one of the two damping components is embodied as a first flywheel mass arrangement connectable to a crank shaft of an internal combustion engine and the other damping component is embodied as a second flywheel mass arrangement comprising a clutch friction surface.

When the first flywheel mass arrangement is thereby mounted on the second flywheel mass arrangement by a rotary bearing, i.e., a slide bearing, the invention requires that the second flywheel mass arrangement encompass the first flywheel mass arrangement in the area of the rotary bearing on the radial inside.

It is further preferred that the rotational vibration damper be provided in the torque transmission path of a torque converter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
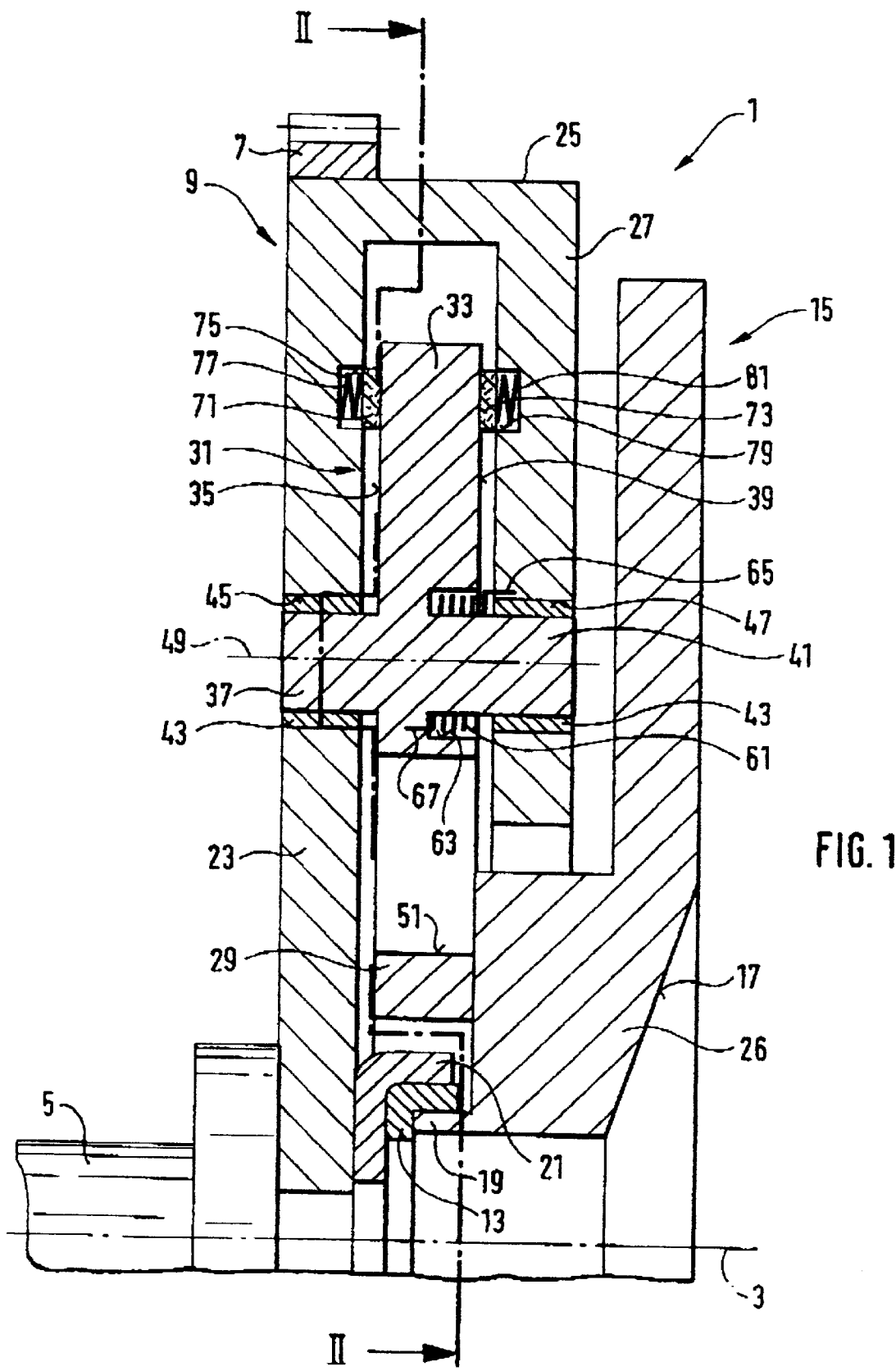
FIG. 1 is a sectional view of along a rotational axis of a rotational vibration damper according to an embodiment of the present invention.
Figure 2:
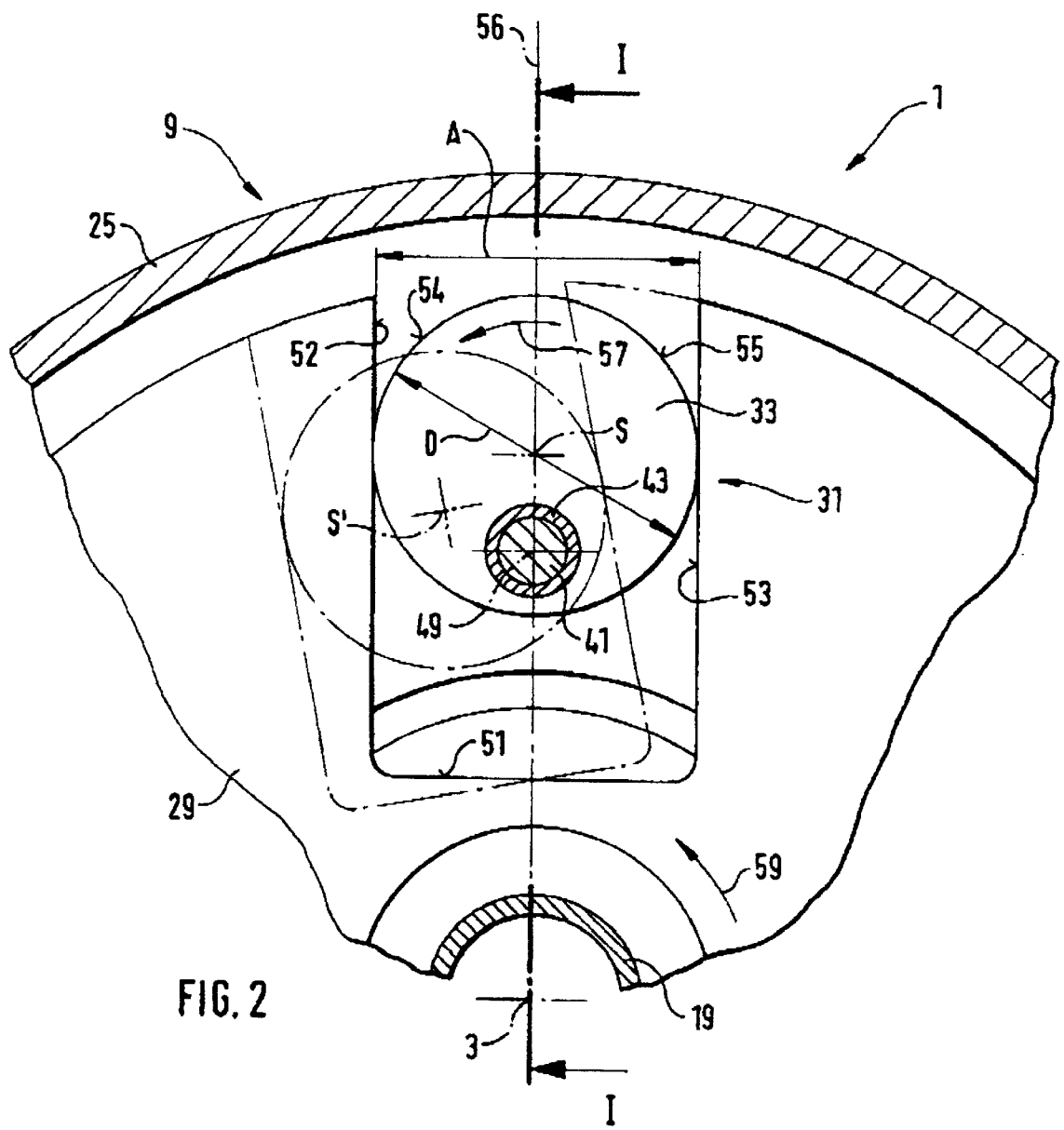
FIG. 2 is a sectional view of the rotational vibration damper as in FIG. 1, along a Line II—II of FIG. 1.

FIGS. 1 and 2 show an embodiment of a rotational vibration damper 1 according to the present invention. The rotational vibration damper 1 is a dual-mass flywheel of a friction clutch of a motor vehicle rotatable about a rotational axis 3 and including an input flywheel mass 9 connected to a crank shaft 5 and equipped with a starting ring gear 7. An output flywheel mass 15 is rotatably mounted on the input flywheel mass 9 via a rotary slide bearing 13. A side of the output flywheel mass 15 facing away from the crank shaft 5 carries a clutch friction surface 17. A bearing shoulder 19 connected to the output flywheel mass 15 extends axially toward the crankshaft 5 and comprises a part of the rotary slide bearing 13 for rotatably mounting the output flywheel mass 15 to the input flywheel mass 9. The bearing shoulder 19 is arranged radially inside of a bearing shoulder 21 of the rotary bearing 13. The bearing shoulder 21 extends axially toward the clutch friction surface 17 and is connected to the input flymass 9.

The longitudinal section of the input flywheel mass 9, shown in FIG. 1, has a U-shaped structure and includes a ring disk part 23, which extends radially outward from the crank shaft 5, an axial section 25 attached to a radially outer end of the ring disk part 23, and a radially inwardly extending ring disk part 27 attached to the other end of the axial section 25. The output flywheel mass 15 has a radially oriented disk part 29 arranged axially between the two ring disk parts 23, 27 of the input flywheel mass 9 and radially inside of the axial section 25. A radially inner part of the ring disk part 29 is connected to a part 26 of the output flywheel mass 15. The part 26 also carries the clutch friction surface 17. In addition to the ring disk part 29, six coupling mass arrangements 31 are arranged axially between the ring disk parts 23, 27. These coupling mass arrangements 31 are distributed evenly around the rotational axis 3 and connect the input flymass 9 to the output flymass 15 for the purpose of rotational force transmission. Each coupling mass arrangement 31 comprises a disk part 33 having a substantially circular outline with respect to section perpendicular to the rotational axis 3. A center of gravity S of the disk part 33 lies substantially at the center of the circular outline.

The disk part 33 has two opposing disk surfaces 35, 39. Attached to the disk surface 35 of the disk part 33 which faces the ring disk part 23 is a first circular-cylindrical bearing journal 37 extending parallel to the rotational axis 3. A second bearing journal 41 is coaxial to the first bearing journal 37 and is also circular-cylindrical. A slide bearing sleeve 43 is mounted on each of the bearing journals 37, 41 and the bearing journals 37, 41 with their slide bearing sleeves engages into corresponding recesses 45 and 47 in the respective ring disk parts 23, 27. The bearing journals 37, 41, the slide bearing sleeves 43 and the recesses 45, 47 form a pivot bearing, which connects the disk part 33 to the input flymass 9 in such a way that the disk part 33 is pivotable around a pivot axis 49 offset in axis-parallel fashion relative to the rotational axis 3.

The disk part 33 is arranged in a radially-outwardly-opening recess 51 of the ring disk part 29 of the output flymass 15. The recess 51 is circumferentially limited by two walls 52 and 53 which face each other and are oriented parallel to each other as well as to a straight line 56 that extends through the rotational axis 3 and in the center between the two walls 52, 53. A distance A between the two walls 52, 53 is slightly larger than a diameter D of the circular disk part 33. Accordingly, the disk part 33 runs substantially without clearance between the walls 52, 53. A surface area 54 of the circular circumferential area of the disk part 33 facing the wall 52 rests on the wall 52 and a surface area 55 of the disk part 33 facing the other wall 53 rests on the other wall 53.

A rotation of the disk part 33 in a rotational direction identified by an arrow 57 in FIG. 2 around the pivot axis 49 occurs when the ring disk part 29 is rotated about the rotational axis 3 with the output flywheel mass 15 relative to the input flywheel mass 9 in a rotational direction identified by an arrow 59 in FIG. 2.

When no torque is transmitted by the rotational vibration damper 1 during operation, the centrifugal force acting on the center of gravity S of the disk part 33 arranged the center of gravity S as far radially outward as possible. This corresponds to a position of the disk part 33 shown by the solid line in FIG. 2 in which the rotational axis 3, the pivot axis 49 and the center of gravity S lie on a straight line 56.

When torque is transmitted during operation of the rotational vibration damper 1 so that, for example, a circumferential force acts on the output flywheel mass 15 in the direction of arrow 59, then the output flywheel mass 15 rotates relative to the input flywheel mass 9 toward the rotational position of the disk part 33 shown in broken lines in FIG. 2. As the output flywheel mass 15 rotates the disk part 33 pivots around the pivot axis 49. The center of gravity S arranges itself at a point S' that is radially inward of the original position when no rotational force was transmitted. The centrifugal force acting on the center of gravity S' of the disk part 33 attempts to again press the center of gravity as far radially outside as possible, and thereby induces a force which presses the surface area 55 of the disk part 33 against the wall 53 of the recess 51. This force induced by the centrifugal force counteracts the circumferential force resulting from the torque to be transmitted, so that the position shown in broken lines in FIG. 2 is an equilibrium position at a constant torque to be transmitted.

When fluctuations occur in the torque to be transmitted, the output flywheel mass 15 moves out of the equilibrium position relative to the input flywheel mass 9 for enabling a damping the torque fluctuations. The movement of the output flywheel mass 15 around the rotational axis 3 is accompanied by a movement of the disk part 33 about the pivot axis 49. To pivot about the pivot axis 49, the disk part 33 is accelerated and furnishes an inertial force counteracting the pivoting movement.

At low rotational speeds of the rotational vibration device, the centrifugal force acting on the disk part 33 is relatively small. To improve the rotational vibration damping effect of the rotational vibration damper 1 at lower speeds, a helical spring 61 is arranged on the disk part to support the effect of the centrifugal force. In the load-free state, the helical spring 61 arranges the disk part 33 in the position shown in a solid line in FIG. 2, and the disk part 33 can be pivoted around the pivot axis 49 against the restoring spring force of the helical spring 61. The helical spring 61 is arranged in a ring groove 63 of the disk part 33. The ring groove 63 has an inner diameter that is approximately equal to the diameter of the bearing journal and is coaxial to the pivot axis 49. One end 65 of the helical spring 61 engages a boring of the ring disk part 27 of the input flywheel mass 9 and another end 67 of the helical spring 61 engages a boring of the disk part 33.

Two friction linings 71 and 73 are arranged on the disk part 33 to further dampen rotational vibrations between the disk part 33 and the input flywheel mass 9 and to prevent resonant vibrations. The friction lining 71 is arranged in a recess 75 of the ring disk part 23 of the input flywheel mass 9 and is pressed via a spring 77 which is also arranged in the recess 75 toward the disk surface 35. Similarly, on the opposing side of the disk part 33, a spring 81 is arranged in a recess 79 of the ring part 27 of the input flywheel mass 9 and presses the friction lining 73 toward the disk surface 39.

The following discussion relates to various embodiments based on the rotational vibration damper 1 shown in FIGS. 1 and 2. Components that are the same with respect to structure and function are identified by the same reference numbers that are used in FIGS. 1 and 2, but are followed by a letter for differentiation. For explanation of these components, reference is made to the entire above description.

Figure 3:
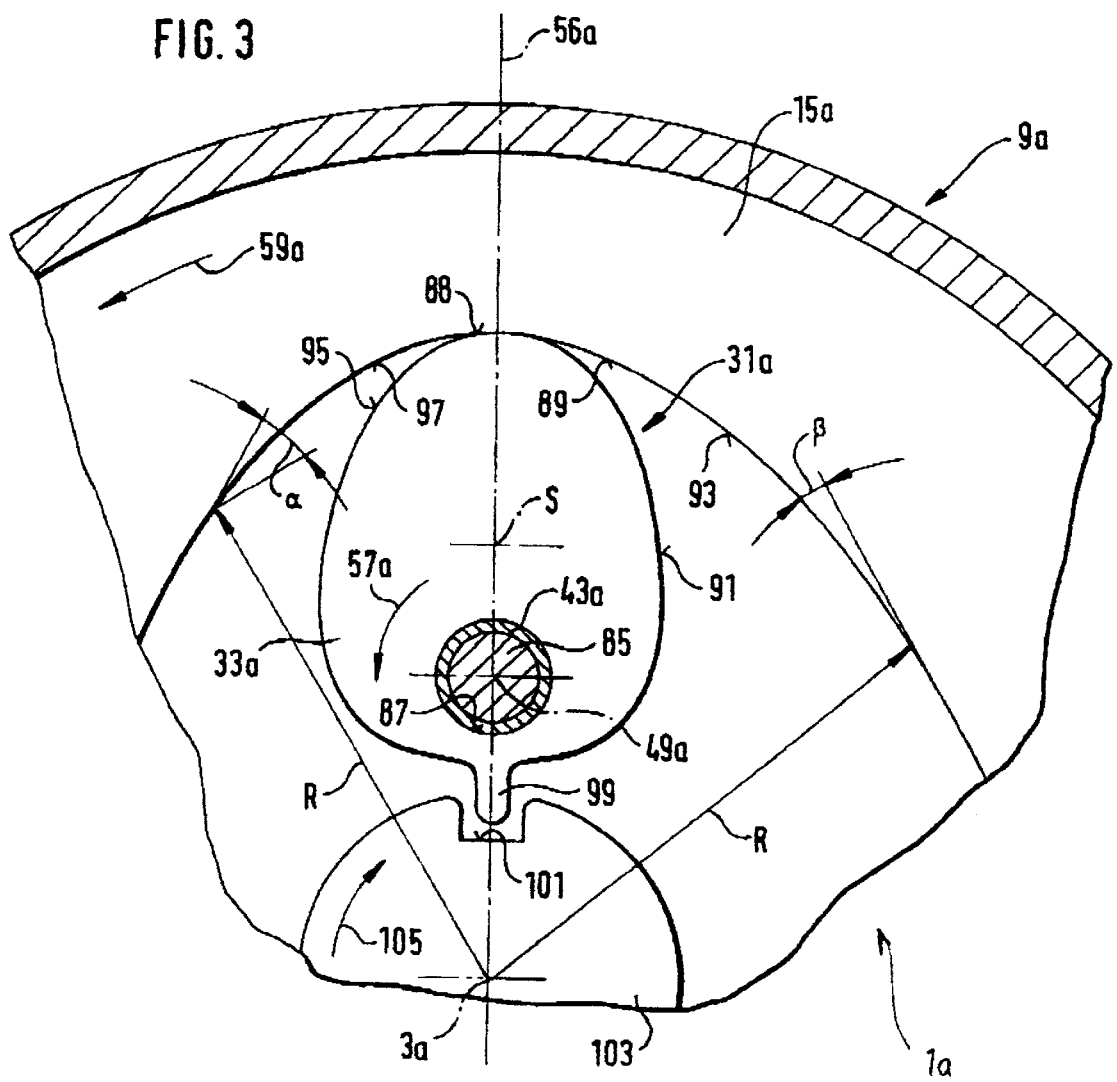
FIG. 3 is a partial sectional view of a rotational vibration damper according to another embodiment of the present invention.

Referring to FIG. 3, a sectional view of a rotational vibration damper 1a along a plane perpendicular to a rotational axis 3a shows a coupling mass arrangement 31a and a first damping component 9a. A bearing journal 85 parallel to the axis of rotation 3a is attached to the first damping component 9a. An outer circumference of the bearing journal 85 carries a slide bearing sleeve 43a which is inserted in a circular recess 87 in a disk part 33a so that the outer circumference of the slide bearing sleeve 43a rests on an inner circumference of the circular recess 87. The disk part 33a is pivotable around a pivot axis 49 which is parallel to the rotational axis 3a and central to the bearing journal 85 on the first damping component 9a.

In contrast to the embodiment of FIG. 2, the disk part 33a of FIG. 3 has a roughly egg-shaped outline. The center of gravity S of the disk part 33a is again arranged offset relative to the pivot axis 49a.

In the embodiment shown in FIG. 3, no torque is being transmitted from the first damping component 9a to a second damping component 15a. This is evidenced by the fact the center of gravity S of the disk part 33a is as distant as possible from the rotational axis 3a and is thus arranged on a straight line 56a through the rotational axis 3a and the pivot axis 49a.

A radially outer area 88 of the circumferential surface of the disk part 33a lies on a surface area of the second damping component 15a which faces the rotational axis 3a. Accordingly, the disk part 33a rests radially on the second damping component 15a under the effect of the centrifugal force acting upon it. When the disk part 33a rests on the second damping component 15a, the pivot bearing 43a is relieved.

When a torque is transmitted between the first damping component 9a and the second damping component 15a such that the second damping component 15a moves relative to the first damping component 9a along the direction of an arrow 59a, a surface area 91 of the disk part 33a rests on a surface area 93 of the second damping component 15a. The disk part 33a is deflected relative to the pivot axis 49a in the direction of an arrow 57a when the second damping component 15a moves along the direction of arrow 59. When an opposing torque is transmitted, a surface area 95 of the disk part 33a rests on a corresponding surface area 97 of the second damping component 15a and the coupling mass 31a pivots relative to the pivot axis 49a in a direction opposite to the arrow 57a.

The surface areas 93 and 97 have a concave curve, so that their inclination relative to the circumferential direction declines continuously from the radial inside to the radial outside. This concave embodiment of the surface areas 93, 97 of the second damping component 15a, along with the convex embodiment of the surface areas 87, 91 and 95 of the disk part 33a, largely permits the rolling of the disk part 33a on the corresponding surfaces of the second damping component 15a while substantially avoiding slide friction.

At a radius R to the rotational axis 3a, the surface area 97 has an inclination α to the circumferential direction that is greater than an inclination β of the surface area 93 at the same radius R. At other radii to the rotational axis 3a, the inclination of the surface area 97 relative to the circumferential direction is also greater than that of the surface area 93 at the same radii. As a result, deflections of the damping component 15a relative to the damping component 9a in the direction of the arrow 59a lead to smaller deflections of the disk part 33a around the pivot axis 49a than do corresponding deflections of the second damping component 15a against the direction of the arrow 59a. Therefore, the rotational vibration damper displays more flexible behavior or less rigidity upon deflection in the direction of the arrow 59a than upon deflection in the opposite direction.

As FIG. 3 shows, a journal 99 extending from a side of the disk part 33a facing the rotational axis 3a engages a radially-outwardly-opening recess 101 of a disk 103 that is rotatable around the rotational axis 3a. When the disk part 33a is pivoted relative to the pivot axis 49a in the direction of the arrow 57a in response to a rotation of the second damping component 15a, the disk 103 is rotated around the rotational axis 3a in a direction identified by an arrow 105. Due to this connection of the disk part 33a to the disk 103, an inertial force, which is determined from the inertial moment of the disk part 33a relative to the pivot axis 49a and the inertial moment of the disk 103 relative to the rotational axis 3a, counteracts a pivoting of the disk part 33a around the pivot axis 49a. This combined inertial moment is greater than the inertial moment of the coupling mass 31 alone.

Figure 4:
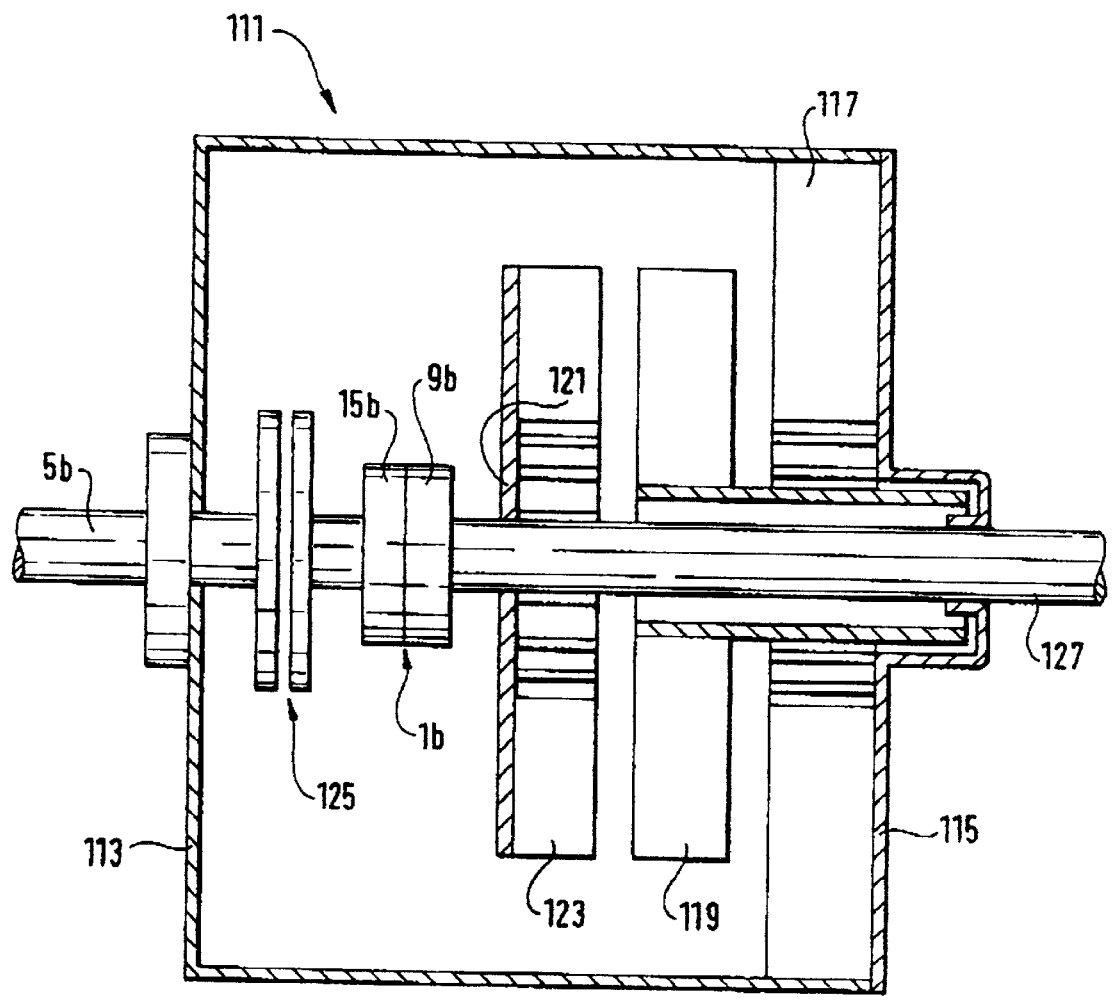
FIG. 4 is a schematic diagram of a torque converter with a rotational vibration damper according to the present invention installed in a torque transmission path.

FIG. 4 schematically shows a torque converter 111 including a converter housing 113 connected to a crank shaft 5b. The torque converter also includes a pump wheel shell 115 connected in rotation-proof fashion to a plurality of pump wheel blades 117 arranged in the interior of the converter housing 113. Also arranged in the interior of the converter housing 113 are a guide wheel 119 and a turbine wheel hub 121. The turbine wheel hub 121 carries a plurality of turbine wheel blades 123 in rotation-proof fashion. The turbine wheel hub 121 is connected in rotation-proof fashion to an output shaft 127 of the torque converter 111. Also connected in rotation-proof fashion to the turbine wheel hub 121 is a first damping component 9b of a torsional vibration damper 1b, shown only schematically. A second damping component 15b of the torsional vibration damper 1b, which is connected to the first damping component 9b for the purpose of transmitting rotational forces, can be connected to the converter housing 113 by means of a bridge coupling 125 of the torque converter 111. The illustrated rotational vibration damper 1b is thus effective when the bridge coupling 125 is engaged, and damps the rotational vibrations occurring between the crank shaft 5b and the output shaft 127.

In addition to arranging the rotational vibration damper 1b between the bridge coupling 125 and the output shaft 127 of the torque converter, as shown in FIG. 4, the rotational vibration damper 1b may also be arranged between other components of the torque converter that are rotatable relative to each other. For example, the rotational vibration damper may be connected between the converter housing and the bridge coupling, between the turbine wheel hub and the output shaft, between the turbine wheel hub and the turbine blades, or between the converter housing and the pump wheel shell.

In addition to the arrangement shown in FIG. 1 of a spring device between the coupling mass arrangement and the first damping component, a spring device may also be arranged to act between the two damping components, so as to keep these damping components in a basic rotational position relative to each other. Similarly, a friction device that acts between the two damping components to damp rotational vibrations and suppress their resonances may also be used instead of the friction linings 71, 73.

The invention is not limited by the embodiments described above which are presented as examples only but can be modified in various ways within the scope of protection defined by the appended patent claims.

I claim:

1. A rotational vibration damper, comprising:

a first damping component rotatably mounted about a rotational axis;

a second damping component rotatably mounted about said rotational axis and rotatable relative to said first damping component;

a coupling mass arrangement having a center of gravity and pivotally connected to said first damping component about a pivot axis that is offset and axis-parallel relative to said center of gravity and to said rotational axis;

said coupling mass arrangement comprising first and second contact surface regions facing away from each other and arranged at a distance from each other along a circumferential direction; and said second damping component comprising first and second counter-contact surface regions facing toward each other and arranged at a distance from each other along the circumferential direction, said first and second counter-contact surface regions respectively contacting said first and second contact surfaces of said coupling mass arrangement for transmitting rotational force between said first and second damping components.

2. The rotational vibration damper of claim 1, wherein said first and second counter-contact surface regions extend substantially parallel to a plane containing said rotational axis.

3. The rotational vibration damper of claim 1, wherein at least one of said first and second counter-contact surface regions extends radially outward and circumferentially toward the other of said first and second counter-contact surface regions starting from a radially inner end area.

4. The rotational vibration damper of claim 3, wherein said at least one of said first and second counter-contact surface regions comprises an inclination relative to the circumferential direction that decreases continuously along the radially outward direction.

5. The rotational vibration damper of claim 4, wherein each said first and second counter-contact surface regions comprises an inclination relative to the circumferential direction; and said inclination relative to the circumferential direction of the first counter-contact surface region at a predetermined radius relative to said rotational axis is smaller than said inclination relative to the circumferential direction of the second counter-contact surface region at said predetermined radius.

6. The rotational vibration damper of claims 1, wherein said contact surface regions of the coupling mass arrangement projected onto a plane perpendicular to said rotational axis comprises a convex surface curve.

7. The rotational vibration damper of claim 1, wherein said coupling mass arrangement comprises a disk element oriented substantially orthogonally relative to said pivot axis.

8. The rotational vibration damper of claim 7, wherein said disk element comprises a substantially circular outline.

9. The rotational vibration damper of claim 1, wherein said second damping component comprises a third counter-contact surface region directed substantially toward the rotational axis; and said coupling mass arrangement being operatively arranged on said pivot axis such that said coupling mass arrangement rests radially on said third counter-contact surface region when said coupling mass arrangement is in a rotational position in which said pivot axis and said center of gravity are arranged substantially on a plane containing said rotational axis.

10. The rotational vibration damper of claim 1, wherein each said first and second contact surface regions of said coupling mass arrangement respectively contact said first and second counter-contact surface regions in at least a partial range of possible rotational positions of the coupling mass arrangement relative to the pivot axis, wherein a rotational position in which said pivot axis and said center of gravity are arranged substantially on a plane containing said rotational axis is within said at least a partial range.

11. The rotational vibration damper of claim 1, further comprising a spring arrangement operatively resiliently connected from producing a restoring force between said coupling mass arrangement and said second damping component such that said coupling mass arrangement is deflectable from a basic pivot position relative to said second damping component against said restoring force, said basic pivot position comprising a position of said coupling mass arrangement in which said pivot axis and said center of gravity are arranged substantially on a plane containing said rotational axis.

12. The rotational vibration damper of claim 1, further comprising a friction device connecting said coupling mass arrangement with said second damper component for damping rotational vibrations between said coupling mass arrangement and said second damping component.

13. The rotational vibration damper of claim 1, wherein said coupling mass arrangement further comprises a carrier device arranged at a distance from said pivot axis and engaging an auxiliary mass rotatably mounted about said rotational axis, said carrier device being operatively arranged for rotating said auxiliary mass relative to the rotational axis upon pivoting of the coupling mass arrangement about said pivot axis.

14. The rotational vibration damper of claim 1, further comprising a pivot bearing on said first damping component on which said coupling mass arrangement is mounted.

15. The rotational vibration damper of claim 1, wherein a cross section of said first damping component along said rotational axis comprises a substantially U-shaped structure having two radially extending legs and a connecting piece connecting said two radially extending legs, said U-shaped structure opening radially inward and at least partially encompassing said second damping component and said coupling mass arrangement, wherein said coupling mass arrangement is connected to said radially extending legs.

16. The rotational vibration damper of claim 15, further comprising a pivot bearing on said first damping component on which said coupling mass arrangement is mounted, said pivot bearing comprising a recess on each of said two legs that is coaxial relative to the pivot axis, and said coupling mass arrangement comprising a journal for engaging each said recess.

17. The rotational vibration damper of claim 1, wherein said coupling mass arrangement comprises a plurality of coupling mass arrangements distributed in the circumferential direction around said rotational axis.

18. The rotational vibration damper of claim 1, wherein said second damping component comprises a rotary bearing and said first damping component is rotatably mounted on said rotary bearing of said second damping component.

19. The rotational vibration damper of claim 1, wherein one of said first and second damping components comprises a first flywheel mass arrangement connectable to a crank shaft of an internal combustion engine and the other of said first and second damping components comprises a second flywheel mass arrangement having a clutch friction surface.

20. The rotational vibration damper of claim 19, wherein said second damping component comprises a rotary bearing and said first damping component is rotatably mounted on said rotary bearing of said second damping component, and wherein a radially inner side of said second flywheel mass arrangement encompasses a radially inner area of said first flywheel mass arrangement in the area of said rotary bearing.

21. The rotational vibration damper of claim 1, wherein said first and second damping components are connectable in a rotational force transmission path of a torque converter.

* * * * *